United States Patent
Brummelhuis (12) 
(10) Patent No.: US 6,575,104 B2
(45) Date of Patent: Jun. 10, 2003

(54) APPARATUS AND METHOD FOR CLEARING TRASH FROM FURROW OPENER PATH

(76) Inventor: Antonius J. M. Brummelhuis, 71 Prairie Meadow Road, Brooks, Alberta (CA), T1R 0E1

( * ) Notice: Subject to any disclaimer, the term of this patent is extended or adjusted under 35 U.S.C. 154(b) by 0 days.

(21) Appl. No.: 10/027,649

(22) Filed: Dec. 21, 2001

(65) Prior Publication Data

US 2002/0078869 A1 Jun. 27, 2002

(30) Foreign Application Priority Data

Dec. 21, 2000 (CA) ............................................ 2329396

(51) Int. Cl.[7] .................................................. A01C 5/06
(52) U.S. Cl. ....................................... 111/139; 172/540
(58) Field of Search ............................ 172/540, 29, 31, 172/541, 542, 545, 547–566, 602–605; 111/140, 128, 52, 135, 139

(56) References Cited

U.S. PATENT DOCUMENTS

| | | | |
|---|---|---|---|
| 4,785,890 A | | 11/1988 | Martin |
| 5,076,180 A | * | 12/1991 | Schneider .................... 111/139 |
| 5,346,020 A | | 9/1994 | Bassett |
| 5,477,792 A | * | 12/1995 | Bassett et al. ............... 111/121 |
| 5,497,836 A | | 3/1996 | Groff |
| 5,878,678 A | | 3/1999 | Stephens et al. |
| 5,970,892 A | | 10/1999 | Wendling et al. |
| 6,279,666 B1 | * | 8/2001 | Nikkel et al. ................ 172/574 |

* cited by examiner

Primary Examiner—Robert E. Pezzuto
(74) Attorney, Agent, or Firm—Frost Brown Todd LLC (57) ABSTRACT

A method for clearing trash from a furrow opener path comprises moving first trash from a first path with a front finger wheel and then moving second trash from a next path on top of the first trash with a rear finger wheel. An apparatus for practicing the method comprises a front finger wheel rotatably mounted to the apparatus and oriented to move trash from a first path to a first side of the apparatus. A rear finger wheel is oriented to move trash from an adjacent second path to an opposite second side of the apparatus. The finger wheels are mounted such that bottom edges thereof are maintained at a substantially constant vertical position relative to the ground by at least one depth control wheel rolling along the ground on the first path cleared by the front finger wheel.

22 Claims, 10 Drawing Sheets

APPARATUS AND METHOD FOR CLEARING TRASH FROM FURROW OPENER PATH

This invention is in the field of agricultural seeding equipment, and in particular devices for clearing trash from the ground surface to permit effective working of the ground such as seeding, fertilizing, and the like.

BACKGROUND

Tillage has been much reduced in modem agriculture in order to reduce costs, conserve moisture, and so forth. Seeding without tillage, or no-till seeding, has become common and preferred by many for crops such as grains, oilseeds, and pulses grown on the prairies of North America. These crops typically are grown in narrow rows, from 6 to 12 inches apart.

Both disc and hoe type furrow openers are popular for no-till seeding as each have their own advantages. The performance of both disc and hoe types is best where crop residue such as straw and chaff, commonly referred to as trash, is light and evenly spread. Where trash is heavy, the disc may ride out of the ground. The discs can also push straws into the ground, a common problem called "hairpinning". Hoe type openers often gather straw between them as they proceed along the field, causing plugging.

Modem furrow openers also commonly include depth control wheels that maintain a constant depth of penetration into the soil, providing proper seed depth for optimum germination and growth. Heavy trash can interfere with proper operation of these depth control wheels, since ideally they should run on the ground, or over a thin, preferably consistent, layer of trash so that the proper depth is maintained. Where trash is thick and uneven, the depth control wheel rides up and over the trash, drawing the furrow opener out of the ground and reducing seed depth to less than optimum, often in fact leaving seed on top of the ground.

Prior art has been addressed to devices for clearing trash from the path of a furrow opener to improve performance. U.S. Pat. No. 4,785,890 to Martin, U.S. Pat. No. 5,346,020 to Bassett, U.S. Pat. No. 5,497,836 to Groff, and U.S. Pat. No. 5,878,678 to Stephens et al. disclose trash clearing apparatuses that include a pair of spoked or toothed trash clearing finger wheels in a V orientation in front of a furrow opener, such that the centers of the finger wheels are substantially located on a line parallel to the operating travel direction. The finger wheels clear trash in each direction from in front of the opener. Where such V oriented finger wheels are used in a narrow row spacing, with the furrow openers close together, the trash thrown away from the path by one of the finger wheels of the V apparatus is thrown against trash being thrown the opposite way by the opposite finger wheels of the adjacent V apparatus. The trash is thus not thrown clear since the two streams of trash meet.

U.S. Pat. No. 5,970,892 to Wendling et al. shows a single similar wheel, essentially one half of the V apparatus of the '678 patent to Stephens et al. The single wheel clears sufficient area to improve the performance of the disc. The clearing wheel is oriented to throw trash to the side of the row opposite the depth control wheel, and does not therefore clear trash from the path of the depth control wheel.

Trash clearing finger wheels are well known in a variety of types, as disclosed for example in U.S. Pat. No. 5,346,020 to Bassett, U.S. Pat. No. 5,497,836 to Groff, and U.S. Pat. No. 5,878,678 to Stephens et al.

These finger wheel clearing apparatuses should be maintained in proper relation to the ground without entering the ground and thereby increasing draft and stress on the apparatus, as well as causing excessive soil to be thrown with the trash.

SUMMARY OF THE INVENTION

It is the object of the present invention to provide an improved apparatus for clearing trash from a furrow opener path that is suitable for narrow row spacings. It is a further object of the invention to provide such an apparatus that can incorporate a furrow opening disc for applying agricultural product.

It is a further object of the invention to provide a paired row seeding implement where such a trash clearing apparatus clears trash from the path of two furrow openers.

It is a further object of the invention to provide an improved method of clearing trash suitable for use with narrow row spacings.

The invention provides, in one aspect, an apparatus for clearing trash from a furrow opener path, the trash clearing apparatus adapted for attachment to an implement for movement along the ground in an operating travel direction ahead of a furrow opener. The apparatus comprises a front finger wheel rotatably mounted to the apparatus and oriented to move trash from a first path to a first side of the apparatus and a rear finger wheel rotatably mounted to the apparatus behind the front finger wheel and oriented to move trash from a second path to an opposite second side of the apparatus. The front and rear finger wheels are mounted such that the first and second paths are adjacent to each other, and such that the separation along the operating travel direction between the front and rear finger wheels is such that a first trash stream thrown by the front finger wheel does not meet a second trash stream thrown by the rear finger wheel of an adjacent trash clearing apparatus. A depth control wheel is rotatably mounted to the apparatus such that the depth control wheel rolls along the ground on the first path cleared by the front finger wheel. The depth control wheel is operative to maintain bottom edges of the front and rear finger wheels at a substantially constant vertical position relative to the ground. An adjusting mechanism is operative to adjust a vertical position of the depth control wheel with respect to at least one of the front and rear finger wheels.

The front finger wheel is typically rotatably mounted to the apparatus about a first axis, the first axis oriented at a first angle to the operating travel direction such that a leading side of the front finger wheel is ahead of a trailing side, and at a first angle from the horizontal such that the leading side is below the trailing side thereof whereby trash moved from a first path by the front finger wheel moves to a first side of the apparatus. Similarly the rear finger wheel is typically rotatably mounted to the apparatus behind the front finger wheel about a second axis, the second axis oriented at a second angle to the operating travel direction such that a leading side of the rear finger wheel is ahead of a trailing side, and at a second angle from the horizontal such that the leading side is below the trailing side thereof whereby trash moved from a second path by the rear finger wheel moves to an opposite second side of the apparatus.

In a second aspect the invention provides A paired row seeding implement attachable to a towing vehicle for movement along the ground in an operating travel direction, the implement comprising: a trash clearing apparatus attached to the implement, the apparatus comprising a front finger wheel rotatably mounted to the and oriented to move trash from a first path to a first side of the apparatus, a rear finger wheel rotatably mounted to the apparatus behind the front finger wheel and oriented to move trash from a second path to an opposite second side of the apparatus, wherein the front and rear finger wheels are mounted such that the first and second paths are adjacent to each other and such that the separation along the operating travel direction between the front and rear finger wheels is such that a first trash stream thrown by the front finger wheel does not meet a second trash stream thrown by the rear finger wheel of an adjacent trash clearing apparatus, a depth control wheel rotatably mounted to the apparatus such that the depth control wheel rolls along the ground on the first path cleared by the front finger wheel, the depth control wheel operative to maintain bottom edges of the front and rear finger wheels at a substantially constant vertical position relative to the ground by; and an adjusting mechanism operative to adjust a vertical position of the depth control wheel with respect to at least one of the front and rear finger wheels. A first furrow opening tool is attached to the implement behind the trash clearing apparatus and oriented to follow the first path, and a second furrow opening tool is attached to the implement behind the trash clearing apparatus and oriented to follow the second path. A furrow depth control device mounted at a fixed vertical position relative to at least one furrow opening tool, and oriented to move along the ground between the first and second furrow opening tools and maintain the first and second furrow opening tools at a substantially constant vertical position with respect to the ground.

The apparatus clears two closely adjacent paths, with little trash left between the paths. A furrow opening implement can incorporate a following furrow opener in each path, with a depth control wheel running on the cleared ground of the paths. One depth control device, such as a wheel or skid plate can control the depth of two adjacent openers.

The invention also provides, in a third aspect, a method of clearing trash from a plurality of adjacent paired furrow opener paths of a furrow opening implement, each paired furrow opener path comprising a first path and an adjacent second path. The method comprises with a first front finger wheel, throwing first trash from the first path towards a first side of the paired furrow opener path, relative to an operating travel direction of the implement; after the first trash has substantially landed on the ground, with a rear finger wheel throwing second trash from the second path towards a second side of the paired furrow opener path, relative to the operating travel direction of the implement, and on top of first trash thrown by an adjacent second front finger wheel; maintaining bottom edges of the front and rear finger wheels at a substantially constant vertical position relative to the ground with a depth control wheel oriented to roll along the ground on the first path cleared by the front finger wheel.

The front finger wheel moves trash to one side, and the rear finger wheel moves adjacent trash to the opposite side. In a narrow row spacing, a plurality of front finger wheels moves first trash from a first path in one direction, while the following plurality of rear finger wheels moves second trash in the opposite direction. The first trash has landed on the ground by the time the second trash is moved so that the second trash lands on top of the first trash. Conventionally, the trash is moved both directions at once by a V oriented pair of finger wheels such that the trash moving in one direction hits the trash moving in the opposite direction, resulting in a poor spread, and spill back onto the cleared path.

The bottom edges of the front and rear finger wheels may be maintained at a substantially constant vertical position relative to the ground by one depth control wheel rolling along the ground on the first path cleared by the front finger wheel, and beside or somewhat ahead of the rear finger wheel. The depth control wheel runs on cleared ground of the first path and so maintains the proper relation of the apparatus with the ground, as it does not ride up and down over trash accumulations. Depending on the attachment to the implement, as the apparatus moves along the ground the front and rear finger wheels may move somewhat relative to the ground, however such a system will often provide satisfactory service.

More precise vertical positioning of the front and rear finger wheels may be provided. The front and rear finger wheels may be oriented such that bottom edges thereof are on a horizontal plane as they move up and down with the terrain and a depth control wheel is located between them in a good location to maintain the finger wheels at the proper vertical location relative to the ground.

Alternatively a depth control wheel may be provided adjacent to each finger wheel to control the vertical position thereof. Both depth control wheels run on the cleared ground of the first path, and so are not moving up and down over uncleared trash.

More precise control of the vertical position of the finger wheels reduces excessive stress and soil throw.

The addition of a furrow opening disc closely behind the front finger wheel provides the advantage, well known in the art, of cutting straws that are held under tension by the finger wheel as it pulls the trash away from the path of the furrow opening disc. Agricultural product such as seed or fertilizer can also be placed in the soil.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
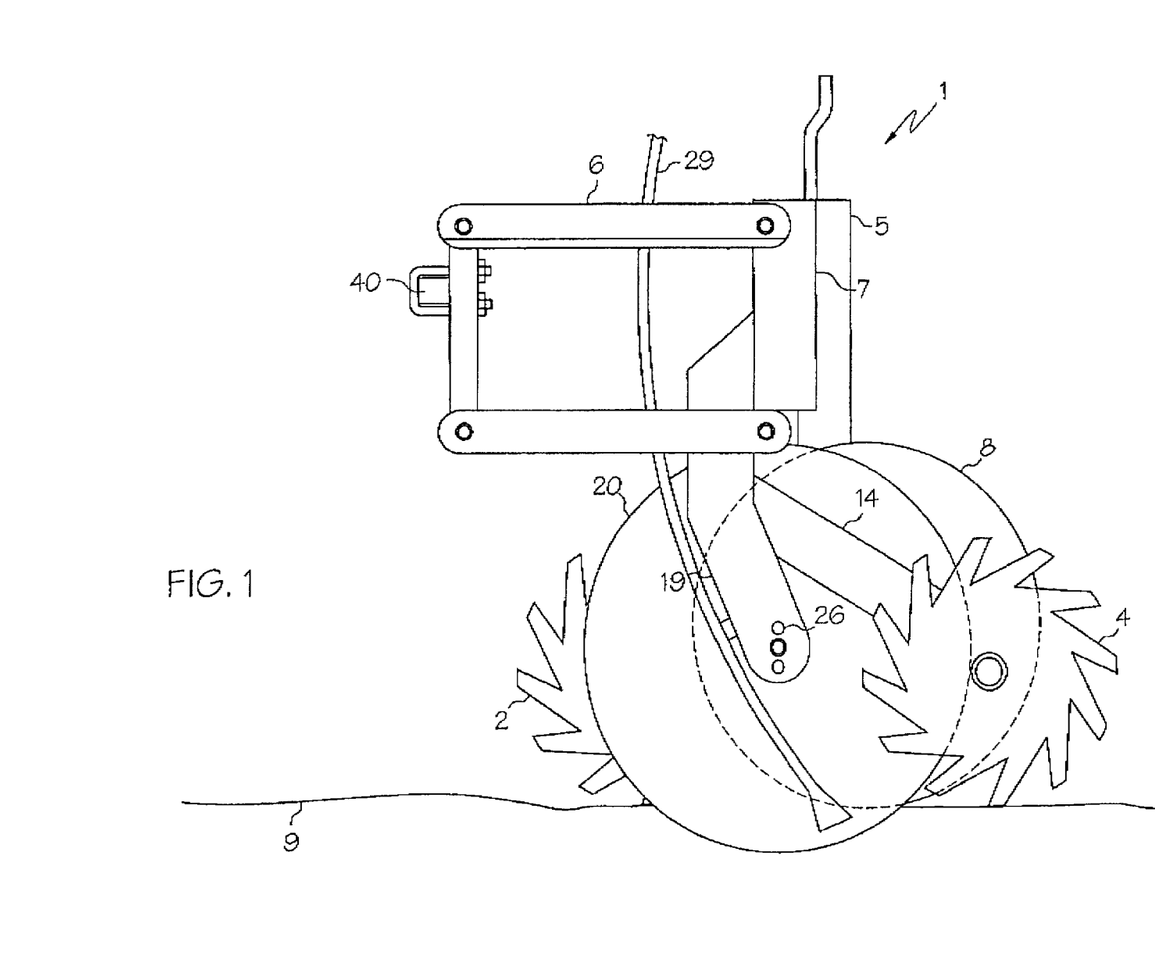
FIG. 1 is a side view of an embodiment of the invention.
Figure 2:
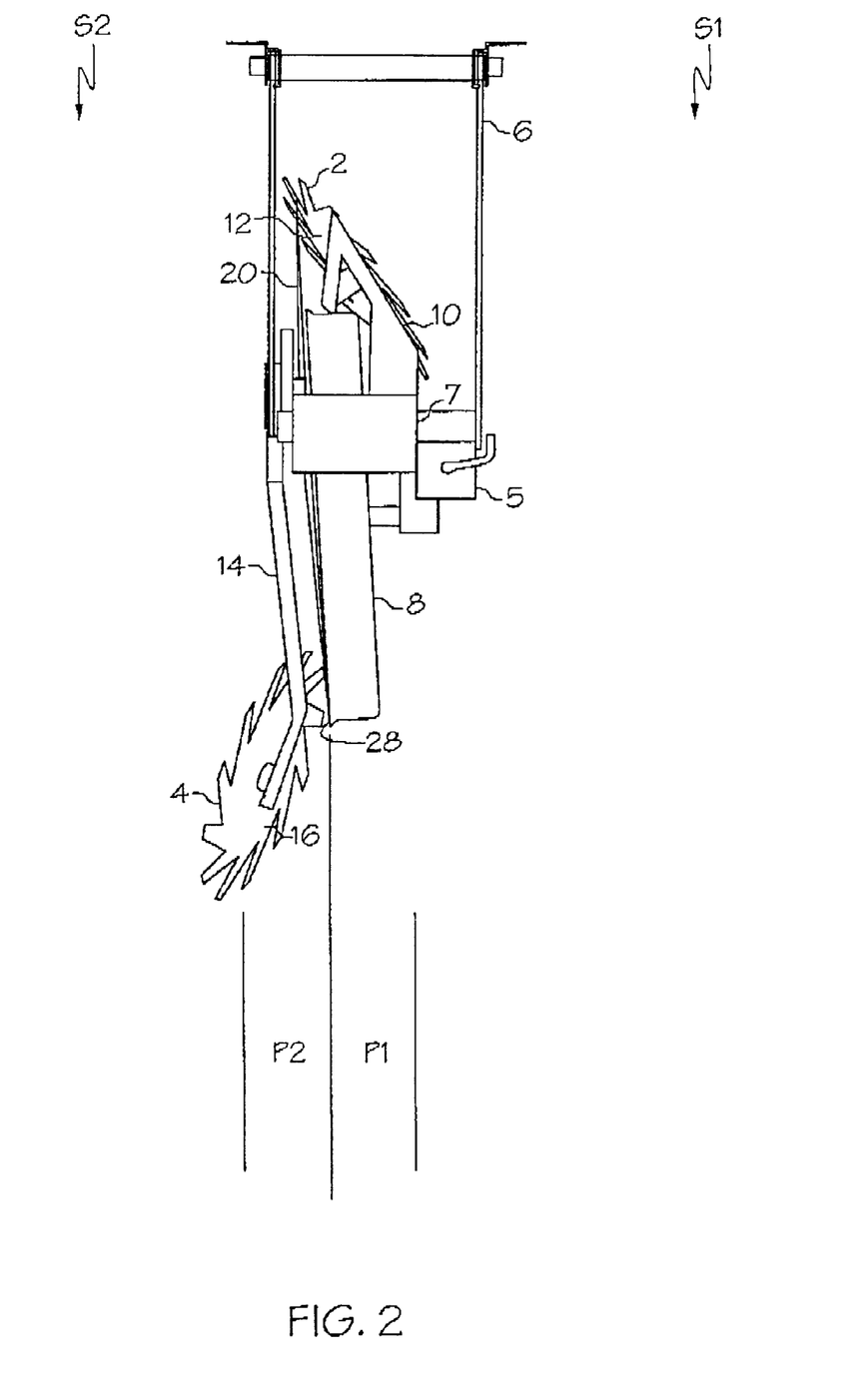
FIG. 2 is a top view of the embodiment of FIG. 1.
Figure 3:
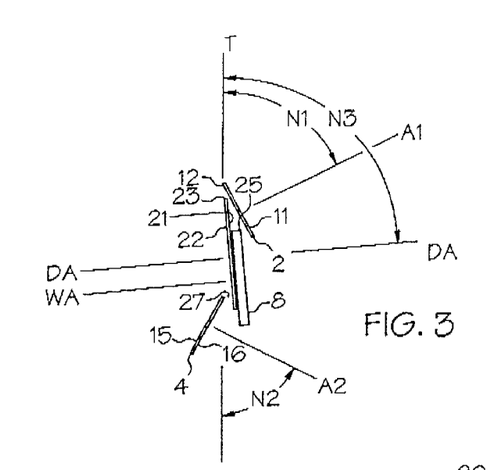
FIG. 3 is a schematic top view of the embodiment of FIG. 1 showing the orientation of the axes of the rotating parts relative to the operating travel direction.
Figure 4:
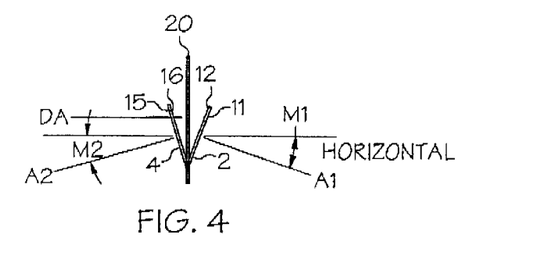
FIG. 4 is a schematic rear view of the embodiment of FIG. 1 showing the orientation of the axes of the rotating parts relative to the horizontal.
Figure 5:
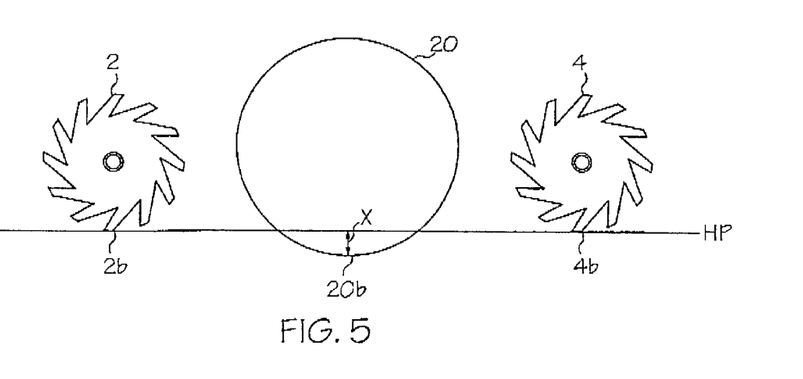
FIG. 5 is a schematic side view showing the vertical relationship of the front and rear finger wheels, and furrow opening disc.

FIGS. 1 and 2 illustrate an apparatus for clearing trash from a furrow opener path. FIGS. 3–5 illustrate the orientation of the various parts. The trash clearing apparatus 1 is adapted for attachment to an implement for movement along the ground in an operating travel direction T ahead of a furrow opener, or a pair of furrow openers. The apparatus 1 is conventionally mounted to a seeding implement frame 40. Down pressure is applied to the apparatus 1 by conventional springs, hydraulic cylinders, or the like.

The apparatus comprises a front finger wheel 2 rotatably mounted to the apparatus 1 and oriented to move trash from a first path P1 to a first side S1 of the apparatus 1. A rear finger wheel 4 is rotatably mounted to the apparatus 1 behind the front finger wheel 2 and is oriented to move trash from a second path P2 to an opposite second side S2 of the apparatus 1. In the embodiments of FIGS. 1 and 2 the front and rear finger wheels 2, 4 are mounted such that bottom edges thereof 2b, 4b are located substantially on a horizontal plane HP and such that the first and second paths P1, P2 are closely adjacent. The bottom edges 2b, 4b are maintained substantially on the horizontal plane HP as the apparatus 1 moves up and down in response to terrain variations as it moves along the ground by the action of the parallel bar linkage 6. The rear bar 7 of the linkage 6 remains substantially vertical as the apparatus 1 moves up and down, and the operating parts of the apparatus 1 are attached thereto as described below.

Figure 6:
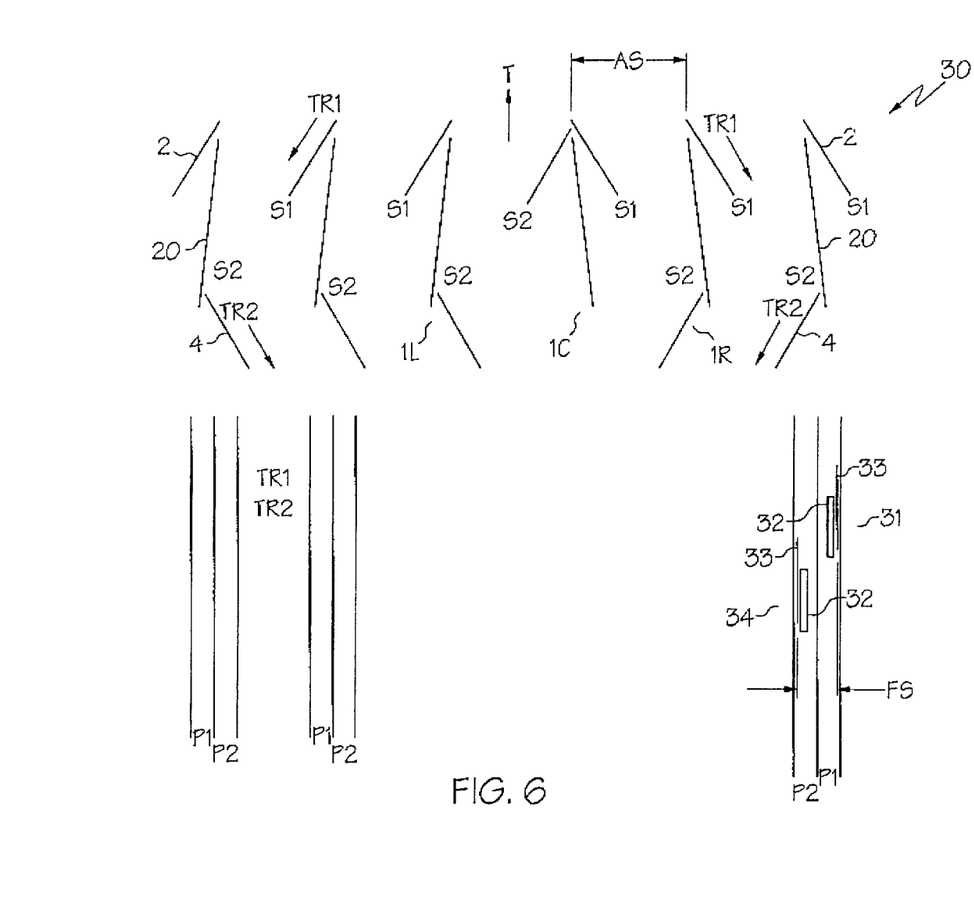
FIG. 6 is a schematic top view of a paired row seeding implement using the embodiment of FIG. 1 to clear trash from a pair of furrow opening tools.

As illustrated in FIG. 6, the separation along the operating travel direction between the front and rear finger wheels 2, 4 is such that a first trash stream TR1 thrown by the front finger wheel 2 does not meet a second trash stream TR2 thrown by the rear finger wheel 4 of an adjacent trash clearing apparatus. For common implement travel speeds, it is contemplated that the separation should be 20 centimeters or more between rotational centers of the finger wheels 2, 4.

A depth control wheel 8 is rotatably mounted to the bottom of an adjusting mechanism, shown in the embodiment as a screw jack 5, fixed to rear bar 7, such that it rolls along the ground 9 ahead of the rear finger wheel 4 on the first path P1 cleared by the front finger wheel 2. The vertical position of the depth control wheel 8 is adjustable relative to a vertical position of the horizontal plane HP by adjustment of screw jack 5. The handle of the screw jack 5 is conveniently located on the top side of the apparatus 1 so that adjustment may be made with reduced bending or crawling under the implement.

The front finger wheel 2 is rotatably mounted to a front arm 10, fixed to the rear bar 7, about a first axis A1 oriented at a first angle N1 to the operating travel direction T such that a leading side 11 of the front finger wheel 2 is ahead of a trailing side 12 and at a first angle M1 from the horizontal such that the leading side 11 is below the trailing side 12 thereof whereby trash moved from the first path P1 by the front finger wheel 2 moves to a first side S1 of the apparatus 1.

Similarly the rear finger wheel 2 is rotatably mounted to a rear arm 14, fixed to the rear bar 7, about a second axis A2 oriented at a second angle N2 to the operating travel direction T such that a leading side 15 of the rear finger wheel 4 is ahead of a trailing side 16, and at a second angle M2 from the horizontal such that the leading side 15 is below the trailing side 16 whereby trash moved from the second path P2 by the rear finger wheel 4 moves to the opposite second side S2 of the apparatus 1. The orientation of the axes A1, A2 is illustrated in FIGS. 3 and 4.

The distance trash is thrown by the rear finger wheel 4 may be reduced by reducing the angle M2 of the second axis A2 to zero, or even tilting the axis A2 back the opposite way. The throwing distance can be varied so that trash stream TR2 thrown by the rear finger wheel 4, as indicated in FIG. 6, does not land on the cleared path P1 of the adjacent apparatus. The trash stream TR1 thrown by the front finger wheel 2 is blocked by the disc 20, and so the throwing distance for this stream TR1 is not as critical as that for stream TR2 where there is nothing to block the stream. The finger wheel angles N1, N2, M1, and M2 can be adjusted for the particular conditions that are encountered.

A furrow opening disc 20 is rotatably mounted to disc arm 19, fixed to rear bar 7, about a disc axis DA oriented at a disc angle N3 to the operating travel direction T such that a leading side 21 of the disc 20 corresponds to the leading side 11 of the front finger wheel 2. The disc angle N3 is sufficiently large to allow the disc 20 to open a furrow as is well known in the art. The disc 20 is located between the front and rear finger wheels 2, 4 such that a front edge 23 of the disc 20 is located ahead of a front edge 25 of the depth control wheel 8 and in proximity to the trailing side 12 of the front finger wheel 2 such that straws contacted by the disc 20 as it cuts into the ground 9 are at substantially the same time contacted by the front finger wheel 2, thereby placing tension on the straws and facilitating cutting of the straws by the disc 20. This orientation of a trash clearing finger wheel and furrow opening disc is known in the present art.

The bottom edge 20b of the disc 20 is located at a fixed distance X below the horizontal plane HP, as illustrated in FIG. 5. The distance X can be varied by mounting the furrow opening disc 20 in various holes 26 in disc arm 19, so that the furrow depth may be varied. The screw jack 5 is adjusted so that the horizontal plane HP is substantially at ground level, such that the finger wheels 2, 4 move trash but not soil. The furrow depth is set by adjusting the distance X with holes 26.

As is common in the field, the disc axis DA is horizontal in the illustrated embodiment, as seen in FIG. 4. Alternately, it is contemplated that the disc axis DA could be at an angle to the horizontal such that the disc is inclined from the vertical as well as the operating travel direction, providing a double angled disc such as the Barton™ disc opener, manufactured by Flexicoil Ltd. of Saskatoon, Canada.

The depth control wheel 8 is rotatably mounted about a wheel axis WA oriented substantially parallel to, and rearward of, the disc axis DA as seen in FIG. 3. A front portion of the trailing side 28 of the depth control wheel 8 is closely adjacent to or touching a portion of the leading side 21 of the furrow opening disc 20 that is rearward of the front edge 23 of the furrow opening disc 20. The depth control wheel 8 runs along the ground 9 over soil moved by the leading side 21 and prevents soil throw. The depth control wheel 8 also cleans the furrow opening disc 20 as it comes out of the ground 9.

The front edge 27 of the rear finger wheel 4 is located in proximity to the trailing side 22 of the disc 20. The paths P1, P2 are thus kept closely adjacent such that minimal trash is left between them.

The apparatus may conveniently include a delivery tube 29 to deliver agricultural product to the furrow created by disc 20. The furrow can be conventionally closed if desired, or will be covered by following furrow openers in a paired row seeding implement.

A paired row seeding implement 30 is schematically illustrated in FIG. 6 to show the action of the trash clearing apparatuses 1 in the field, and to illustrate a set up for a paired row seeder where depth control wheels or skids for the furrow openers of the seeder also run on the cleared paths P1, P2. Depth control is thus improved since the depth control wheels run on the ground and do not ride over trash.

A plurality of right and left trash clearing apparatuses 1R, 1L, and a center apparatus 1C are mounted at the front of the implement 30. The front finger wheels 2 throw first trash stream TR1 from each first path towards a first side S1 of each paired furrow opener path P1, P2, relative to an operating travel direction T of the implement. For the right apparatus 1R, the first side S1 is on the right, and for the left apparatus 1L, the first side S1 is on the left.

After the first trash has landed on the ground, the rear finger wheel 4 throws second trash stream TR2 from each second path P2 towards the opposite second side S2 and on top of the first trash thrown by the front finger wheel 2 of an adjacent apparatus 1.

Thus it can be seen that trash flows smoothly as the implement passes. With prior art trash clearing apparatuses the finger wheels 2, 4 are substantially on the same line perpendicular to the travel direction T, such that first trash stream TR1 is thrown against the second trash stream TR2 such that the trash streams TR1, TR2 collide. This is especially problematic where a narrow row spacing is used.

The implement is shown with right and left apparatuses 1R, 1L in order to balance side draft as is known in the art. The center apparatus 1C is required in the center of the implement to make the transition over from throwing one way with the front finger wheel 2 to the other way.

A first furrow opener 31, including a depth control wheel 32 and a furrow opening tool 33 which as illustrated is a disc but could also be a hoe opener. The furrow opening tool 33 follows the first path P1 and is located toward the first side S1 of the trash clearing apparatus 1 relative to the depth control wheel 32 such that the depth control wheel 32 rolls on or adjacent to the second path P2, between the furrow opening tools 33 of the first and second furrow openers 31, 34.

The second furrow opener 34 is oriented the opposite way, so that the furrow opening tool 33 follows the second path P2 and is located toward the second side S2 of the trash clearing apparatus relative to the depth control wheel 32 such that the depth control wheel 32 rolls on or adjacent to the first path P2, between the furrow opening tools 33 of the first and second furrow openers 31, 34.

The paired row furrow opening tools 33 are thus running on cleared ground at a furrow spacing FS of, for example 5 inches, and as well the depth control wheels 32 are also running, as is preferred, on cleared ground between the furrow opening tools 33. Spacing the apparatuses 1 at a spacing AS of 15 inches along the implement results in a 10 inch spacing between the adjacent paired seed rows. The effective seed row spacing is 7.5 inches, which is desired by some farmers to achieve their preferred plant density. Alternatively seed could be placed through the furrow opening disc 20 and fertilizer through the furrow opening tools 33, to provide a 15 inch row spacing. The apparatus 1 also provides seed/fertilizer separation as required to prevent seed damage.

With the apparatus 1 and furrow opening tools 33 mounted separately on the implement 30, each rides separately over obstacles in the field, such as stones.

Figure 7:
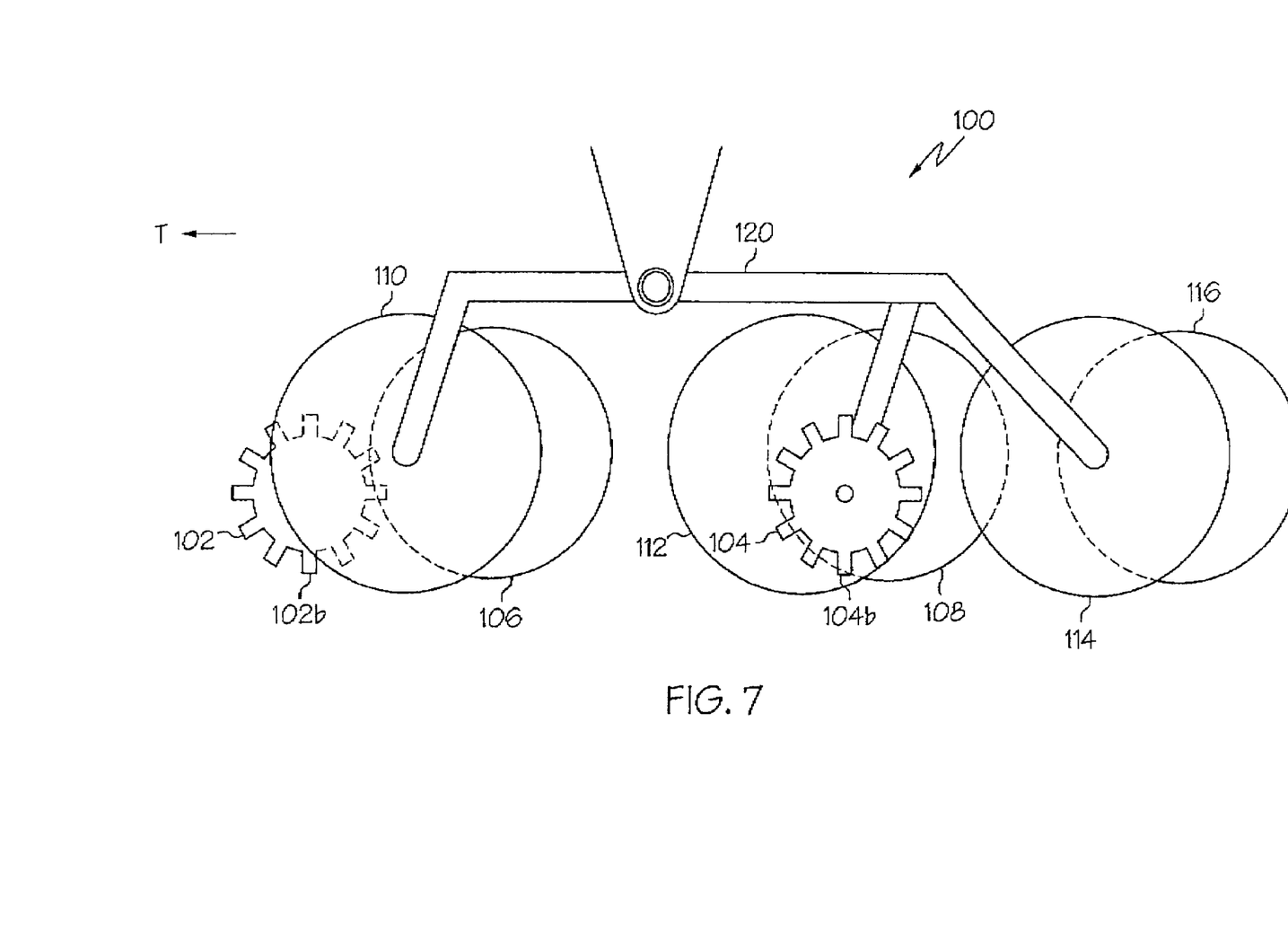
FIG. 7 is a schematic side view of an alternate embodiment where the vertical position of the finger wheels is maintained by a depth control wheel on each finger wheel.
Figure 8:
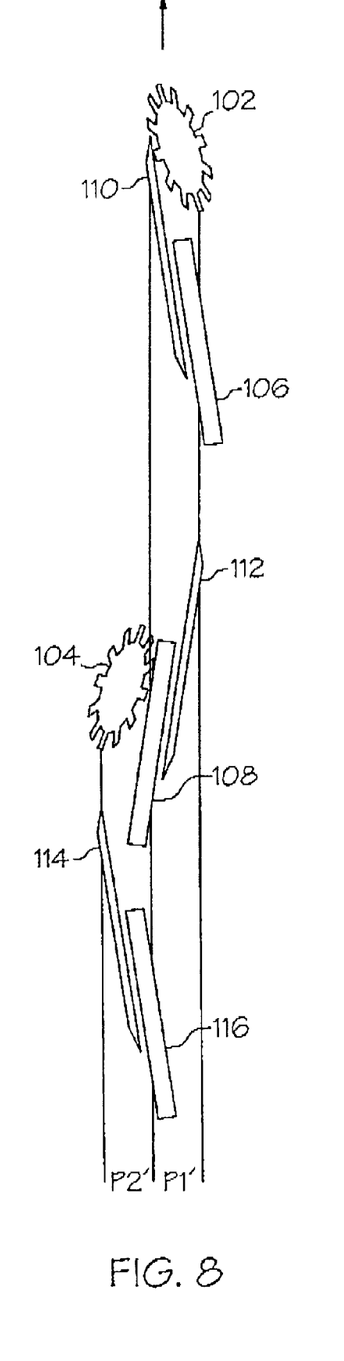
FIG. 8 is a schematic top view of the embodiment of FIG. 7.

An alternate apparatus 100 of the invention is schematically illustrated in FIGS. 7 and 8. The bottom edges 102b, 104b of the front and rear finger wheels 102, 104 are maintained at a substantially constant vertical position relative to the ground as the apparatus 100 moves up and down in response to terrain variations as it moves along the ground by a first depth control wheel 106 mounted to the apparatus 100 in a fixed vertical position relative to the front finger wheel 102 such that the first depth control wheel 106 rolls along the ground ahead of the rear finger wheel 104 on the first path P1' cleared by the front finger wheel 102, and by a second depth control wheel 108 mounted to the apparatus 100 in a fixed vertical position relative to the rear finger wheel 104 such that the second depth control wheel 108 rolls along the ground beside the rear finger wheel 104 on the first path P1'.

A first furrow opening tool, first disc 110, is mounted to the apparatus 100 adjacent to the first depth control wheel 106 and in fixed vertical relation thereto so as to follow the first path P1', and a second furrow opening tool, second disc 112 is mounted to the apparatus 100 adjacent to the second depth control wheel 108 and in fixed vertical relation thereto so as to also follow the first path P1' at a lateral distance from the first disc 110. The depth control wheel 106, 108 run on opposite sides of the respective discs 110, 112 so that same may run on the cleared first path P1'. The depth of the furrows made by first and second discs 110, 112 would be by mounting in one of a plurality of holes, such as holes 26 in FIG. 1.

A third furrow opening tool, third disc 114, is mounted to the apparatus 100 adjacent to a third depth control wheel 116 and in fixed vertical relation thereto so as to follow the second path P2'. The third depth control wheel 116 rolls along the first or second path P1', P2' and controls the depth of the furrow made by the third disc 114.

The depth control wheels 106, 108, 116 can be connected to a screw jack 5 such as illustrated in FIG. 1 to allow easy adjustment of the vertical position of the depth control wheels. One or more of the furrow opening tools could be hoes rather than discs.

The finger wheels 102, 104, discs 110, 112, 114, and depth control wheels 106, 108, 116 are mounted to a walking beam 120 to allow the apparatus 100 to follow ground contours.

Figure 9:
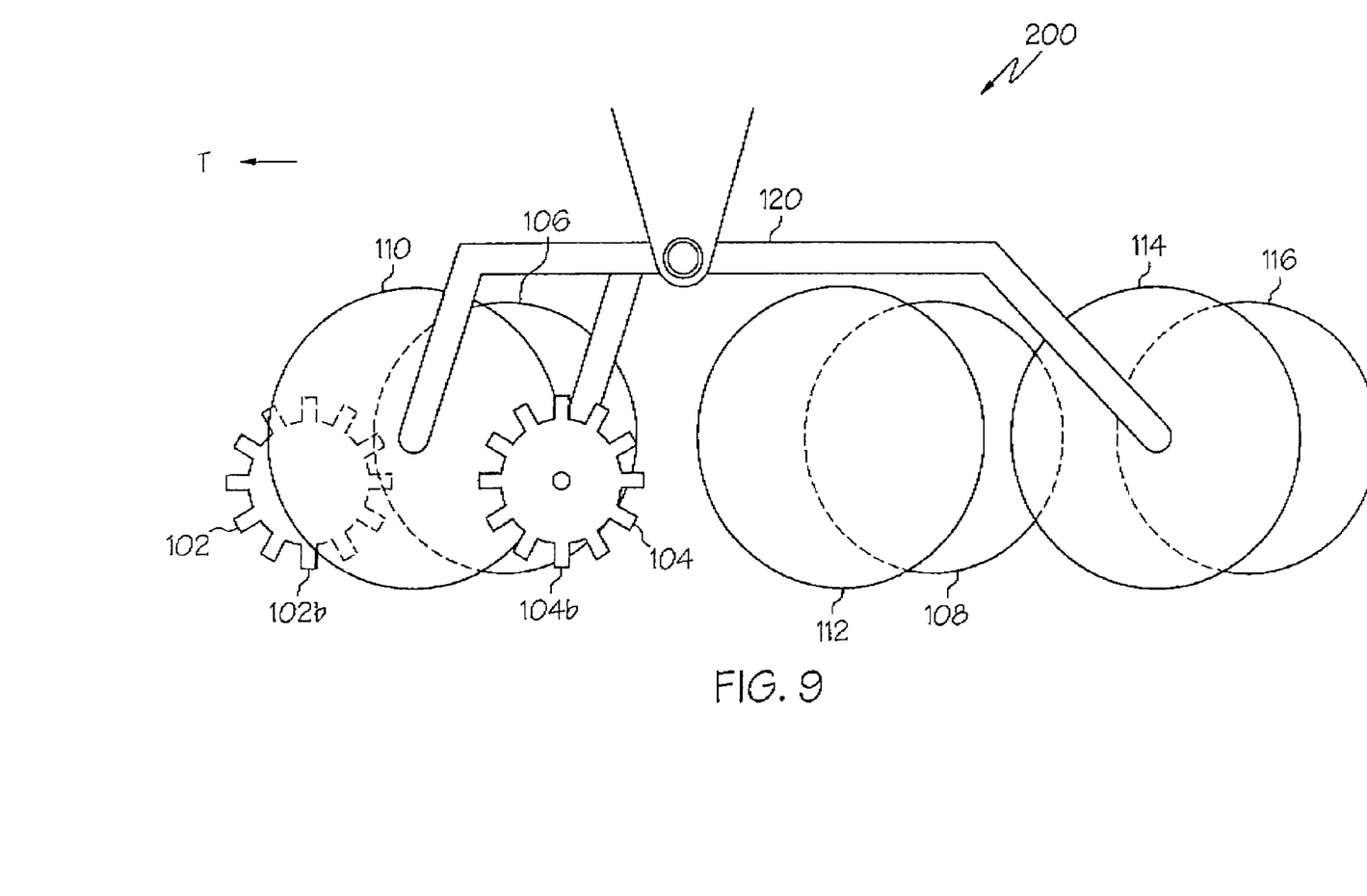
FIG. 9 is a schematic side view of an alternate embodiment where the vertical position of the finger wheels is maintained by a single depth control wheel running between the finger wheels.

FIG. 9 illustrates an alternate apparatus 200 of the invention where the rear finger wheel 104 of FIG. 7 is moved ahead to a position generally beside the first depth control wheel 106 and in fixed vertical relation thereto. First depth control wheel 106 then controls the vertical position of the front and rear finger wheels 102, 104. The vertical control is not as precise as that of the previously illustrated embodiments, however would provide satisfactory service in some conditions, such as on level ground. Second depth control wheel 108 would then adjust the depth of the second disc 112, rather than requiring a plurality of holes as in the apparatus 100 of FIG. 7.

Figure 10:
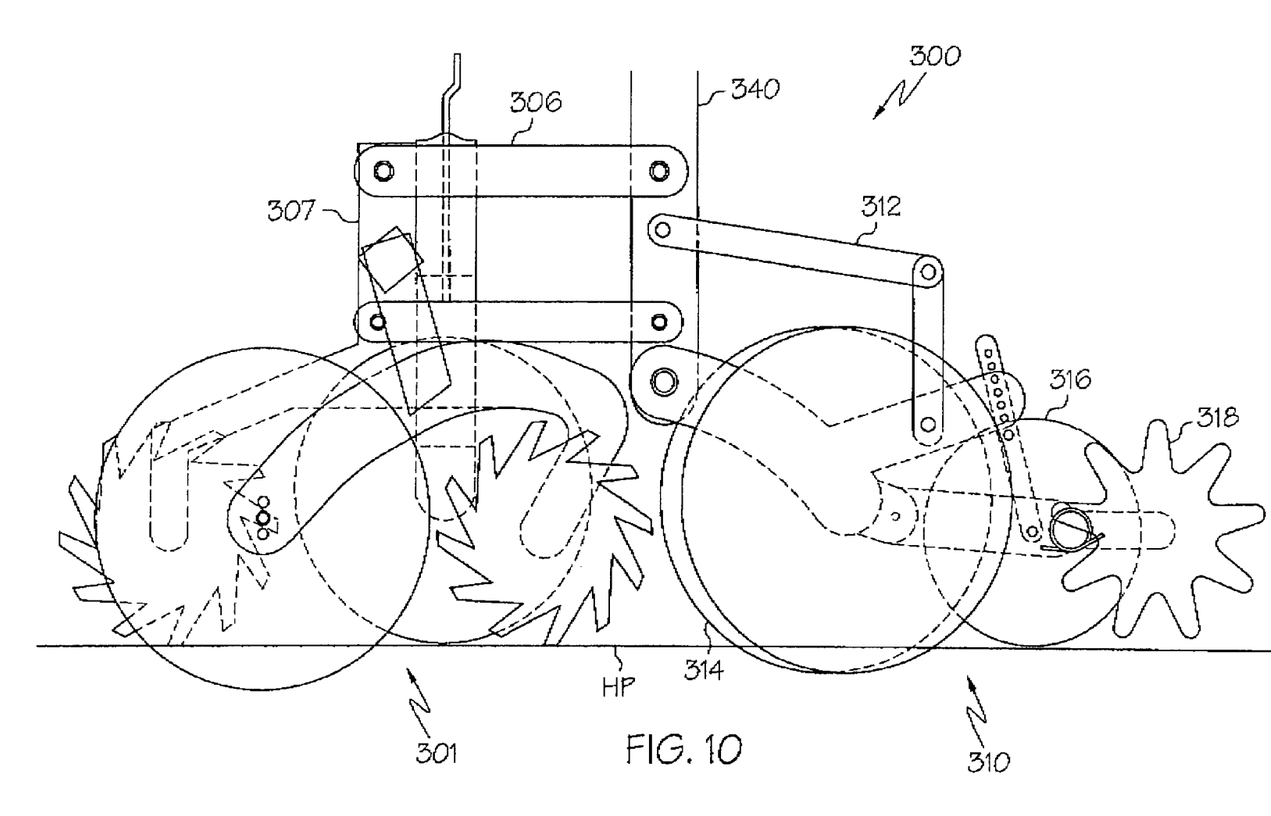
FIG. 10 is a side view of an alternate paired row seeding apparatus of the invention.
Figures 11, 13:
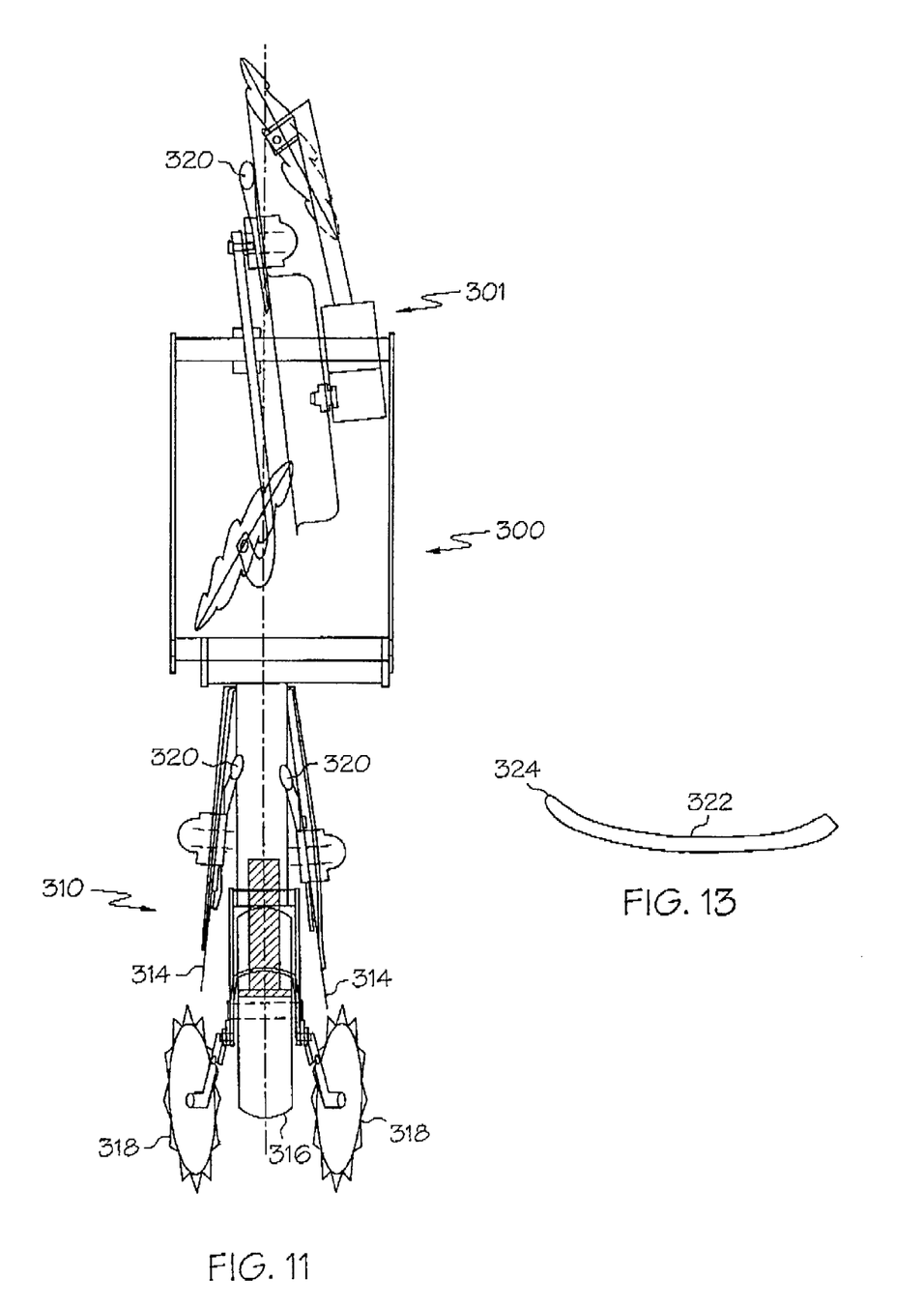
FIG. 11 is top view of the apparatus of FIG. 10.
FIG. 13 is a side view of a skid plate that can be used as a furrow depth control device.
Figure 12:
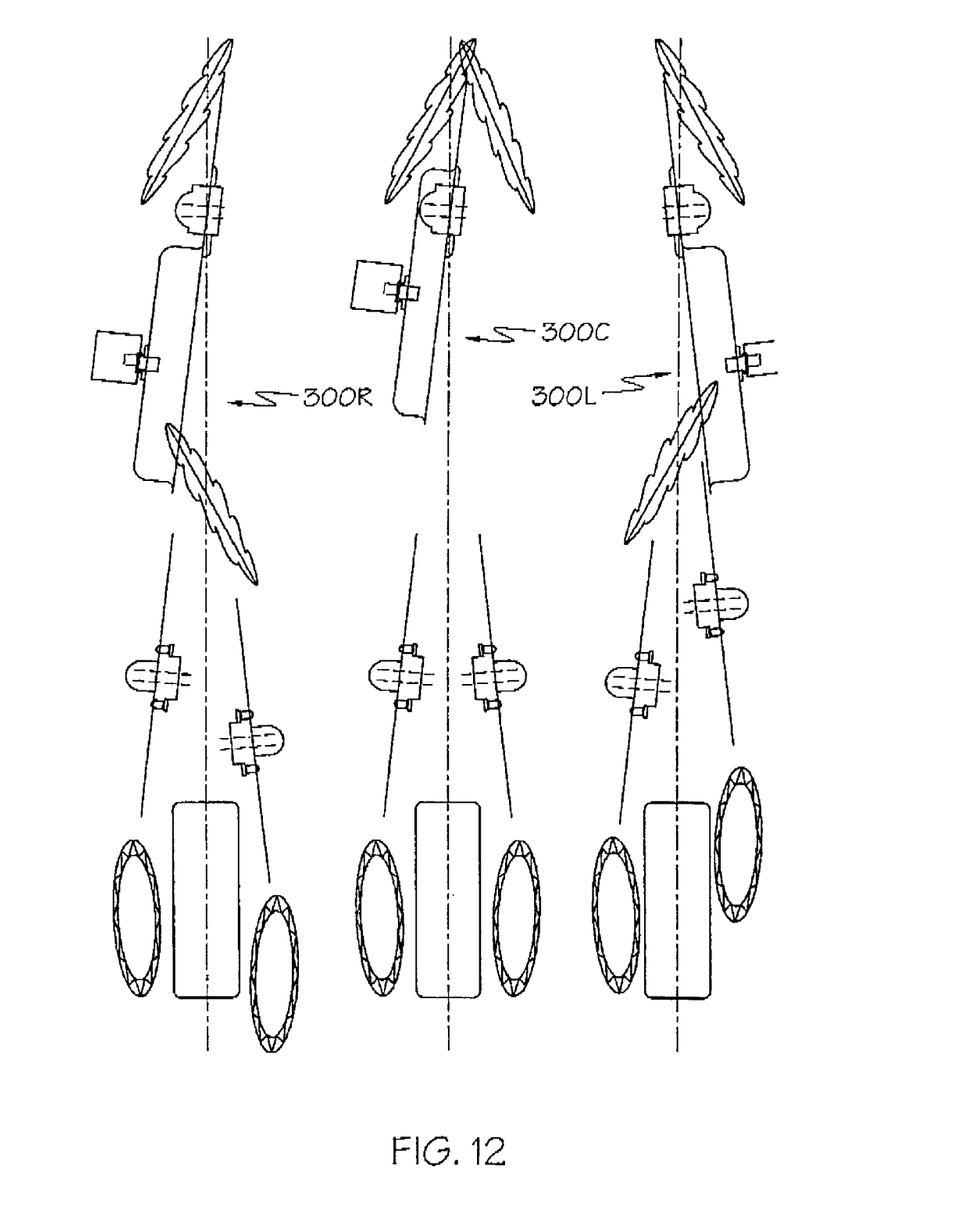
FIG. 12 is a schematic top view of a typical arrangement of a plurality of the paired row seeding apparatuses 300 on an implement.

FIGS. 10–12 illustrate an alternative paired row seeding apparatus 300 of the invention. The trash clearing apparatus 301 is the same as that illustrated in FIGS. 1 and 2, however in this embodiment, the parallel bar linkage 306 is attached to the implement frame 340 at the rear thereof instead at the front thereof as illustrated in FIG. 1. The front bar 307 remains substantially vertical as the apparatus 301 moves up and down, thus maintaining the bottoms of the finger wheels 2, 4 on the horizontal plane HP.

A paired row seeding apparatus 310 is mounted to a second parallel linkage 312 mounted to the implement frame 340 directly behind the trash clearing apparatus 301. Furrow opening tools, illustrated as discs 314, are rotatably mounted to the second parallel linkage 312 and oriented so as to follow in the cleared paths P1, P2 provided by the trash clearing apparatus 301. A single furrow depth control device, illustrated as furrow depth control wheel 316 is oriented to roll along the ground between the discs 314 and control the depth of both discs 314. The wheel 316 runs on the both paths P1 and P2 which are closely spaced so that very little trash is left on the ground between them. Spoked closing wheels 318 are conventionally mounted to close the furrows made by the discs 314, and seed or fertilizer is delivered to the furrows by tubes 320.

An alternate furrow depth control device is schematically illustrated in FIG. 13 as a skid plate 322 with a turned up front end 324. The skid plate 322 follows the ground in the same manner as the wheel 316 and controls the depth of the furrow opening tools, such as discs 314.

FIG. 12 schematically illustrates the arrangement of a plurality of the paired row seeding apparatuses 300 on an implement. Similar to the configuration of FIG. 6, they include a right apparatus 300R, a left apparatus 300L, and a center apparatus 300C.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An apparatus for clearing trash from a furrow opener path, the trash clearing apparatus adapted for attachment to an implement for movement along the ground in an operating travel direction ahead of a furrow opener, the apparatus comprising:
    a front finger wheel rotatably mounted to the apparatus and oriented to move trash from a first path to a first side of the apparatus;
    a rear finger wheel rotatably mounted to the apparatus behind the front finger wheel and oriented to move trash from a second path to an opposite second side of the apparatus;
    wherein the front and rear finger wheels are mounted such that the first and second paths are adjacent to each other;
    wherein the separation along the operating travel direction between the front and rear finger wheels is such that a first trash stream thrown by the front finger wheel does not meet a second trash stream thrown by the rear finger wheel of an adjacent trash clearing apparatus;
    a depth control wheel rotatably mounted to the apparatus such that the depth control wheel rolls along the ground on the first path cleared by the front finger wheel, the depth control wheel operative to maintain bottom edges of the front and rear finger wheels at a substantially constant vertical position relative to the ground; and
    an adjusting mechanism operative to adjust a vertical position of the depth control wheel with respect to at least one of the front and rear finger wheels.

2. The apparatus of claim 1 wherein the front finger wheel, rear finger wheel, and adjusting mechanism are fixed to a rigid member.

3. The apparatus of claim 1 wherein the bottom edges of the front and rear finger wheels are maintained at a substantially constant vertical position relative to the ground as the apparatus moves along the ground by maintaining the bottom edges of the front and rear finger wheels on a substantially horizontal plane, and wherein the depth control wheel maintains a vertical position of the horizontal plane substantially constant relative to the ground as the apparatus moves along the ground.

4. The apparatus of claim 3 wherein the bottom edges of the front and rear finger wheels are maintained on the substantially horizontal plane by attachment to a parallel bar linkage.

5. The apparatus of claim 1 wherein the means to maintain bottom edges of the front and rear finger wheels at a substantially constant vertical position relative to the ground as the apparatus moves along the ground comprises:
    a front depth control wheel mounted to the apparatus in a fixed vertical position relative to the front finger wheel such that the front depth control wheel rolls along the ground ahead of the rear finger wheel on the first path;
    a front adjusting mechanism operative to adjust the vertical position of the front depth control wheel with respect to at the front finger wheel;
    a rear depth control wheel mounted to the apparatus in a fixed vertical position relative to the rear finger wheel such that the rear depth control wheel rolls along the ground beside the rear finger wheel on the first path; and
    a rear adjusting mechanism operative to adjust the vertical position of the rear depth control wheel with respect to the rear finger wheel.

6. The apparatus of claim 1 further comprising a furrow opening disc rotatably mounted between the front and rear finger wheels.

7. The apparatus of claim 6 wherein the furrow opening disc is rotatably mounted to the apparatus about a disc axis oriented at a disc angle sufficiently large to allow the furrow opening disc to open a furrow, the furrow opening disc located between the front and rear finger wheels such that a front edge of the furrow opening disc is located ahead of a front edge of the depth control wheel and in proximity to a trailing side of the front finger wheel such that straws contacted by the furrow opening disc as it cuts into the ground are at substantially the same time contacted by the front finger wheel, thereby placing tension on the straws and facilitating cutting of the straws by the furrow opening disc.

8. The apparatus of claim 7 wherein the depth control wheel is rotatably mounted about a wheel axis oriented substantially parallel to the disc axis, and rearward of the disc axis, such that a front portion of a trailing side of the depth control wheel is closely adjacent to or touching a portion of a leading side of the furrow opening disc that is rearward of a front edge of the furrow opening disc.

9. The apparatus of claim 7 further comprising a delivery tube operative to deliver agricultural product to the furrow.

10. The apparatus of claim 5 further comprising a first furrow opening tool mounted to the apparatus adjacent to the front depth control wheel and in fixed vertical relation thereto so as to follow the first path, and a second furrow opening tool mounted to the apparatus adjacent to the rear depth control wheel and in fixed vertical relation thereto so as to follow the first path at a lateral distance from the first furrow opening tool.

11. The apparatus of claim 10 further comprising a third furrow opening tool mounted to the apparatus adjacent to a third depth control wheel and in fixed vertical relation thereto so as to follow the second path, the third depth control wheel rolling along the first or second path.

12. The apparatus of claim 1 wherein the adjusting mechanism is operated by a control located on a top side of the apparatus.

13. The apparatus of claim 1 wherein a center of the rear finger wheel is at least 20 centimeters behind a center of the front finger wheel.

14. A paired row seeding implement attachable to a towing vehicle for movement along the ground in an operating travel direction, the implement comprising:
   a trash clearing apparatus attached to the implement, the apparatus comprising:
      a front finger wheel rotatably mounted to the and oriented to move trash from a first path to a first side of the apparatus;
      a rear finger wheel rotatably mounted to the apparatus behind the front finger wheel and oriented to move trash from a second path to an opposite second side of the apparatus;
      wherein the front and rear finger wheels are mounted such that the first and second paths are adjacent to each other;
      wherein the separation along the operating travel direction between the front and rear finger wheels is such that a first trash stream thrown by the front finger wheel does not meet a second trash stream thrown by the rear finger wheel of an adjacent trash clearing apparatus;
      a depth control wheel rotatably mounted to the apparatus such that the depth control wheel rolls along the ground on the first path cleared by the front finger wheel, the depth control wheel operative to maintain bottom edges of the front and rear finger wheels at a substantially constant vertical position relative to the ground by; and
      an adjusting mechanism operative to adjust a vertical position of the depth control wheel with respect to at least one of the front and rear finger wheels;
   a first furrow opening tool attached to the implement behind the trash clearing apparatus and oriented to follow the first path;
   a second furrow opening tool attached to the implement behind the trash clearing apparatus and oriented to follow the second path;
   a furrow depth control device mounted at a fixed vertical position relative to at least one furrow opening tool, and oriented to move along the ground between the first and second furrow opening tools and maintain the first and second furrow opening tools at a substantially constant vertical position with respect to the ground.

15. The implement of claim 14 wherein the furrow depth control device is a skid plate.

16. The implement of claim 14 wherein the furrow depth control device is a wheel.

17. The implement of claim 16 comprising a first depth control wheel mounted at a fixed vertical position relative to the first furrow opening tool and oriented to roll along the ground between the first and second furrow opening tools, and a second depth control wheel mounted at a fixed vertical position relative to the second furrow opening tool and oriented to roll along the ground between the first and second furrow opening tools.

18. The implement of claim 14 wherein the trash clearing apparatus is mounted on a front parallel bar linkage attached to the implement, and wherein the first furrow opening tool, second furrow opening tool, and the depth control device are mounted on a second bar parallel linkage attached to the implement behind the front parallel bar linkage.

19. The apparatus of claim 14 wherein a center of the rear finger wheel is at least 20 centimeters behind a center of the front finger wheel.

20. A method of clearing trash from a plurality of adjacent paired furrow opener paths of a furrow opening implement, each paired furrow opener path comprising a first path and an adjacent second path, the method comprising:
   with a first front finger wheel, throwing first trash from the first path towards a first side of the paired furrow opener path, relative to an operating travel direction of the implement;
   after the first trash has substantially landed on the ground, with a rear finger wheel throwing second trash from the second path towards a second side of the paired furrow opener path, relative to the operating travel direction of the implement, and on top of first trash thrown by an adjacent second front finger wheel;
   maintaining bottom edges of the front and rear finger wheels at a substantially constant vertical position relative to the ground with a depth control wheel oriented to roll along the ground on the first path cleared by the front finger wheel.

21. The method of claim 20 further comprising cutting straws held in tension by the front finger wheels with a furrow opening disc.

22. The method of claim 21 further comprising depositing agricultural product in a furrow created by the furrow opening disc.

* * * * *